US011748177B2

United States Patent
Ohashi et al.

(10) Patent No.: US 11,748,177 B2
(45) Date of Patent: Sep. 5, 2023

(54) NOTIFICATION CONTROL DEVICE, NOTIFICATION CONTROL SYSTEM, AND NOTIFICATION CONTROL METHOD

(71) Applicant: Panasonic Intellectual Property Management Co., Ltd., Osaka (JP)

(72) Inventors: Yoshiki Ohashi, Osaka (JP); Kohei Tahara, Osaka (JP); Hiroko Sugimoto, Kyoto (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 0 days.

(21) Appl. No.: 17/772,435

(22) PCT Filed: Jun. 30, 2021

(86) PCT No.: PCT/JP2021/024677
§ 371 (c)(1),
(2) Date: Apr. 27, 2022

(87) PCT Pub. No.: WO2022/079952
PCT Pub. Date: Apr. 21, 2022

(65) Prior Publication Data
US 2022/0374293 A1 Nov. 24, 2022

(30) Foreign Application Priority Data
Oct. 16, 2020 (JP) .................. 2020-174551

(51) Int. Cl.
*G06F 9/54* (2006.01)
(52) U.S. Cl.
CPC .................. *G06F 9/542* (2013.01)
(58) Field of Classification Search
CPC ..... G06F 9/542; G06F 16/1734; H04L 41/06; H04L 41/0604
See application file for complete search history.

(56) References Cited

U.S. PATENT DOCUMENTS 9,843,566 B2 * 12/2017 Smith .................. H04L 63/0442
10,754,714 B1 * 8/2020 Adams .................... G06F 21/84
(Continued)

FOREIGN PATENT DOCUMENTS

| JP | 2007-155602 A | 6/2007 |
| JP | 2015-138538 A | 7/2015 |

(Continued)

OTHER PUBLICATIONS

International Search Report issued in corresponding International Application No. PCT/JP2021/024677, dated Aug. 10, 2021.

*Primary Examiner* — Andy Ho
(74) *Attorney, Agent, or Firm* — McDermott Will & Emery LLP

(57) ABSTRACT

A notification control device includes: a sound notification controller that sends a first notification control signal for causing a first device to provide a first notification, obtains first response information to the first notification, and determines whether the first response information is in response to notification information; an image notification controller that sends a second notification control signal for causing a second device to provide a second notification, when the first response information is determined not to be in response to the notification information, obtains second response information to the second notification, and determines whether the second response information is in response to the notification information; and a canceller that sends, to the first and second devices, a cancellation process signal for cancelling the notifications, when the first response information or the second response information is determined to be in response to the notification information.

7 Claims, 11 Drawing Sheets

(56) References Cited

U.S. PATENT DOCUMENTS

| | | | |
|---|---|---|---|
| 10,930,137 B2 * | 2/2021 | Sun .................... | G08B 25/009 |
| 2007/0129884 A1 | 6/2007 | Yamada | |
| 2015/0213694 A1 | 7/2015 | Miura | |
| 2016/0307413 A1 | 10/2016 | Rafii et al. | |
| 2019/0384542 A1 | 12/2019 | Tomioka | |

FOREIGN PATENT DOCUMENTS

| | | |
|---|---|---|
| JP | 6355974 B2 | 7/2018 |
| JP | 2019-144836 A | 8/2019 |
| JP | 6598020 B2 | 10/2019 |
| JP | 2019-220756 A | 12/2019 |

\* cited by examiner (a)

Respond by voice (explicitly)

(b)

Respond by voice (not explicitly)

(c)

Respond by screen operation

User's action in response to notification

Non-response to notification provided again after being begged

NOTIFICATION CONTROL DEVICE, NOTIFICATION CONTROL SYSTEM, AND NOTIFICATION CONTROL METHOD

CROSS REFERENCE TO RELATED APPLICATIONS

This application is the U.S. National Phase under 35 U.S.C. § 371 of International Application No. PCT/JP2021/024677, filed on Jun. 30, 2021, which claims the benefit of Japanese Application No. 2020-174551, filed on Oct. 16, 2020, the entire contents of each of which Applications are hereby incorporated by reference in their entirety.

TECHNICAL FIELD

The present disclosure relates to a notification control device, a notification control system, and a notification control method.

BACKGROUND ART

A technology has been present for providing a user with a notification, in the form of image or sound, about a process performed by a device (see patent literature (PTL) 1).

CITATION LIST

Patent Literature

[PTL 1] Japanese Unexamined Patent Application Publication No. 2015-138538

SUMMARY OF INVENTION

Technical Problem

However, when a notification is to be provided to the user, who is to receive the notification, without consideration of the state or behavior of such user, a problem arises that the notification cannot be appropriately provided to the user.

In view of the above, the present disclosure provides a notification control device and so forth that enable a notification to be appropriately provided from a device to a user.

Solution to Problem

The notification control device according to the present disclosure is a notification control device including: an obtainer that obtains notification information relating to an operation performed by a device; a first notification controller that: sends a first notification control signal for causing a first device to provide a first notification indicating details of the notification information; obtains first response information to the first device that has provided the first notification; and determines whether the first response information is in response to the notification information; a second notification controller that: sends a second notification control signal for causing a second device to provide a second notification indicating the details of the notification information, when the first notification controller determines that the first response information is not in response to the notification information, the second notification being implemented in a form different from a form of the first notification; obtains second response information to the second device that has provided the second notification; and determines whether the second response information is in response to the notification information; and a canceller that sends, to the first device and the second device, a cancellation process signal for cancelling the notifications indicating the details of the notification information, when the first notification controller determines that the first response information is in response to the notification information or the second notification controller determines that the second response information is in response to the notification information.

With this aspect, the notification control device provides the second notification when the user does not respond to the first notification that has been provided. When receiving a response to the first notification or the second notification after that, the notification control device cancels the notifications. The notification control device utilizes notifications in two different forms as described above, in consideration of whether the user has provided a response. This circumvents situations such as where the same notification is provided to the user again who already recognizes the details of such notification and the notification implemented in a form which the user cannot receive is repeatedly provided. With this, it is possible for the notification control device to enable the notification to be appropriately provided from the device to the user. This also provides the effects of being able to prevent an increase in processing load and power consumption in a device used for notifications as well as preventing the user from being annoyed.

Also, the first notification controller may resend the first notification control signal when determining, within predetermined time after sending the first notification control signal, that neither the first response information nor the second response information is in response to the notification information.

With this aspect, the notification control device further resends the first notification when the user responds neither to the first notification nor the second notification provided. This enables the user who has failed to being notified by the foregoing notifications to receive the notification that has been resent. It is also possible to prevent the same notification to be provided again to the user who has provided a response upon receiving the notification. Resending the first notification, the notification control device enables the notification to be more appropriately provided from the device to the user.

Also, the first notification controller may send, as the first notification control signal, a signal for causing the first device to provide the first notification by sound output, and the second notification controller may send, as the second notification control signal, a signal for causing the second device to provide the second notification by image display.

With this aspect, the notification control device utilizes sound output as the first notification and image display as the second notification. A sound notification is characterized in that it needs to be received while the sound relating to such notification is being outputted and an image notification is characterized in that it can be received by the user whenever the image continues to be displayed. As such, the use of a notification by sound output and a notification by image display enables the user to more reliably receive the notification. Using a notification by sound output and a notification by image display, the notification control device enables the notification to be appropriately provided from the device to the user.

Also, the cancellation process signal that is sent when the first notification controller obtains a sound signal as the first response information may be a cancellation process signal that is sent when the first notification controller obtains an operation signal as the first response information, the operation signal indicating an operation performed on the device in response to the first notification.

With this aspect, the notification control device cancels the notifications after waiting for the user to perform an action to the device, even when the notification control device obtains a response from the user by voice that is provided in response to the sound output provided as the first notification. This prevents the user from forgetting to perform an action to the device after only providing a response by voice. More strongly prompting the user to perform an action to the device, the notification control device enables the notification to be more appropriately provided from the device to the user.

The cancellation process signal that is sent when the second notification controller obtains an operation signal as the second response information may be a cancellation process signal that is sent when the second notification controller obtains the operation signal as the second response information, the operation signal indicating an operation performed on the device in response to the second notification.

With this aspect, the notification control device cancels the notifications after waiting for the user to perform an action to the device, even when the notification control device obtains a response provided by the user by performing an operation on the image display provided as the second notification. This prevents the user from forgetting to perform an action to the device after only providing a response by performing the operation. More strongly prompting the user to perform an action to the device, the notification control device enables the notification to be more appropriately provided from the device to the user.

Also, the notification control system according to the present disclosure is a notification control system that includes the foregoing notification control device, the first device that provides the first notification, and the second device that provides the second notification.

With this aspect, it is possible to provide the same effect as that provided by the foregoing notification control device.

Also, the notification control method according to the present disclosure is a notification control method performed by a notification control device. Such notification control method includes: obtaining notification information relating to an operation performed by a device; sending a first notification control signal for causing a first device to provide a first notification indicating details of the notification information; obtaining first response information to the first device that has provided the first notification; and determining whether the first response information is in response to the notification information; sending a second notification control signal for causing a second device to provide a second notification indicating the details of the notification information, when the first response information is determined not to be in response to the notification information, the second notification being implemented in a form different from a form of the first notification; obtaining second response information to the second device that has provided the second notification; and determining whether the second response information is in response to the notification information; and sending, to the first device and the second device, a cancellation process signal for cancelling the notifications indicating the details of the notification information, when the first response information is determined to be in response to the notification information or the second response information is determined to be in response to the notification information.

With this aspect, it is possible to provide the same effect as that provided by the foregoing notification control device.

These general or specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

The notification control device according to the present disclosure is capable of enabling a notification to be appropriately provided from a device to a user.

DESCRIPTION OF EMBODIMENT

Figure 1:
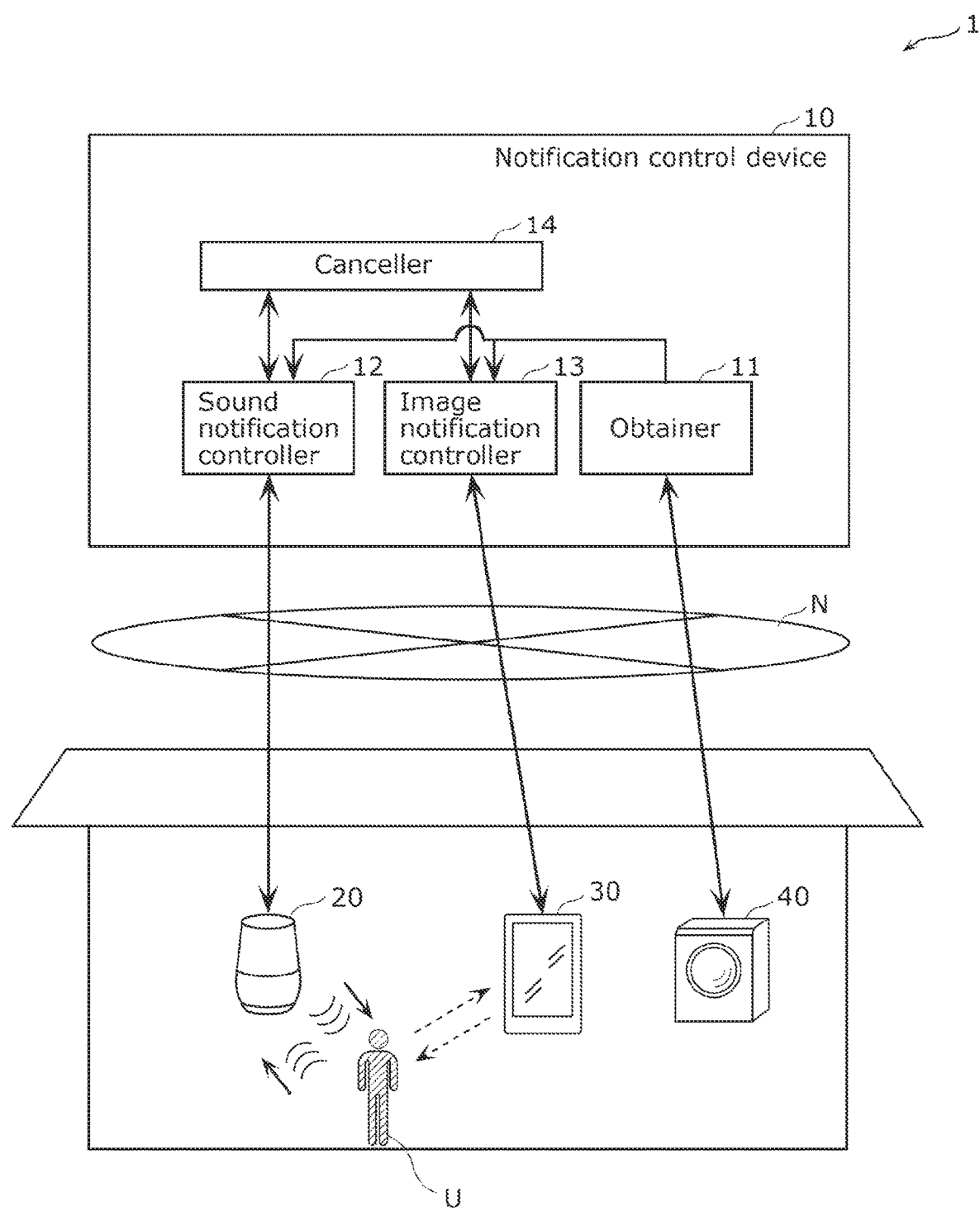
FIG. 1 is an explanatory diagram showing the configurations of a notification control system and a notification control device according to an embodiment.

The following describes in detail the embodiment with reference to the drawings where appropriate. Note, however, that detailed description more than necessary may be omitted. For example, a detailed description of a well-known matter or a repetitive description of substantially the same configuration may be omitted. This is to prevent the following description from becoming unnecessarily redundant and facilitate the understanding of those skilled in the art.

Also note that the inventors provide the accompanying drawings and the following description for those skilled in the art to fully understand the present disclosure, and thus that these do not intend to limit the subject recited in the claims.

In the following, the embodiment will be described after providing a detailed description of the background to the present invention and the problem to be solved by the present invention.

Home appliances such as washing machines and air-conditioners have been conventionally used (such home appliances are also refereed to simply as devices). Such a device provides a notification to a user when, for example, informing the user of that the device has operated on the basis of a user's instruction or prompting the user for an action.

In general, notifications provided from the device to the user include a notification by sound and a notification by image. Depending on their forms, notifications provided from the device to the user can be advantageous and disadvantageous to the user as described below.

For example, a notification by sound is advantageous in that it can be received by the user not only when the user is paying attention to the device but also when the user is paying no attention to the device. Meanwhile, a notification by sound is disadvantageous because the sound relating to the notification needs to be received while such sound is being outputted. Stated differently, the notification cannot be received by the user when the sound is not outputted (more specifically, the sound cannot be received after the sound is outputted).

A notification by image is advantageous in that it can be received by the user whenever the user sees the image being displayed, under the condition that such image continues to be displayed. Meanwhile, a notification by image is disadvantageous in that it cannot be noticed by the user who is paying no attention to the image and thus cannot be received.

The conventional technologies include a technology for providing a user with a notification, in the form of image or sound, about a process performed by a device (see PTL 1).

However, when the notification is to be provided to the user, who is to receive the notification, without consideration of the state or behavior of such user, the same notification can be provided to the user again who already knows about the details of such notification or the notification implemented in a form which the user cannot receive can be repeatedly provided. This leads to an increase in processing load and power consumption of each device. Also, the user can be annoyed by such notifications.

As described above, the conventional technology has a problem of being unable to appropriately provide a notification from the device to the user.

In view of the above, the present disclosure provides a notification control device and so forth that enable a notification including sound to be appropriately provided from a device to a user.

Embodiment

The present embodiment describes a notification control device and so forth that enable a notification including sound to be appropriately provided from a device to a user.

FIG. 1 is an explanatory diagram showing the configurations of notification control system 1 and notification control device 10 according to the present embodiment.

As shown in FIG. 1, notification control system 1 includes notification control device 10, speaker 20, and terminal 30. Note that notification control system 1 may further include device 40.

The foregoing devices each include a communication interface and are connected with each other over network N to be able to perform communications.

Notification control device 10 is a control device that controls a notification provided from device 40 to user U. Notification control device 10 receives, from device 40, information indicating the details of the notification and controls notifications to be provided to user U by speaker 20 and terminal 30. The configuration of notification control device 10 will be described in detail later. Note that the following describes the configuration in which notification control device 10 is provided outside of the house of user U, but notification control device 10 may be provided inside of the house of user U, or may be incorporated in a device located in the house of user U (e.g., a television receiver, etc.).

Speaker 20 is a speaker that provides a notification to user U by sound output (such notification is also referred to as "sound notification"). Speaker 20 outputs sound relating to a sound signal obtained from notification control device 10 or picks up ambient sound by a microphone to generate a sound signal, and sends it to notification control device 10. Speaker 20 provides a sound notification to user U under the control of notification control device 10. Speaker 20 also picks up the voice of user U to generate a sound signal and sends it to notification control device 10. Note that speaker 20, which is a smart speaker, may be incorporated in a device located in the house of user U (e.g., air-conditioner).

Terminal 30 is an information terminal device that provides a notification to user U by image display (such notification is also referred to as "image notification"). Terminal 30 includes at least a display screen that displays an image and an operation device that receives an operation performed by user U on the displayed image. The display screen and the operation device can be implemented by a touch panel display. Note that terminal 30, which is a smartphone, a tablet, or a personal computer, for example, may be incorporated in a device located in the house of user U (e.g., television receiver).

Device 40 is an electrical device that performs a predetermined operation. The following describes an example case where device 40 is a washing machine, but device 40 may also be, for example, an air-conditioner, a microwave oven, a television receiver, a recording device, or a rice cooker.

Device 40 sends, to notification control device 10, information relating to an operation performed by device 40. Of items of information relating to operations of device 40, notification control device 10 determines, as notification information, information that should be notified to user U, on the basis of the details of the information relating to the operation. A sound notification or an image notification is then provided regarding the information determined to be the notification information, under the control of notification control device 10.

More specifically, notification control device 10 obtains information relating to an operation of device 40. Notification control device 10 then determines whether the obtained information relating to the operation is information that should be notified to user U, on the basis of the details of the information. When device 40 is a washing machine, for example, and the information relating to the operation is about "the washing operation has finished", such information is determined to be "notification information" that should be notified to user U. Meanwhile, when device 40 is a washing machine and the information relating to the operation is about "the operation moves onto rinsing", such information is determined not to be "notification information" that should be notified to user.

Note that notification control device 10 is simply required to determine whether information relating to an operation is information that should be notified to user U, on the basis of the details of the information, and thus may utilize a predetermined table. Also, in addition to information relating to an operation of device 40, notification control device 10 may determine settings information of the user or external information relating to device 40 to be information that should be notified to user U (i.e., notification information). When device 40 is a washing machine, for example, and the information relating to an operation is about "the washing operation has finished", notification control device 10 may obtain external information relating to the weather. When the weather after the completion of washing is suitable for drying the laundry (e.g., sunny weather), notification control device 10 may determine, as notification information, information that includes the details that prompt user U to dry the laundry.

Aside from the foregoing notification provided via notification control device 10, device 40 may directly provide a notification to user U. Alternatively, of the items of information relating to operations of device 40, device 40 may determine information that should be notified to user U (notification information) and send the notification information to notification control device 10.

The following describes in detail notification control device 10.

As shown in FIG. 1, notification control device 10 includes obtainer 11, sound notification controller 12, image notification controller 13, and canceller 14. The foregoing functional units can each be implemented by a processor (not illustrated) included in notification control device 10 executing a program, using a memory (not illustrated).

Obtainer 11 is a functional unit that obtains notification information relating to an operation performed by device 40. The notification information includes one of items of predetermined notification information. For example, the notification information is notification information indicating that the washing machine, which is device 40, has finished the washing operation. Such notification information is also interpretable as indicating the necessity for user U to take out the washed laundry. Note that obtainer 11 may obtain notification information or information relating to an operation of device 40 from a server to which device 40 is connected over a network.

Sound notification controller 12 is a functional unit that controls a sound notification. Sound notification controller 12 sends, to speaker 20, a first notification control signal for causing speaker 20 to provide a first notification indicating the details of the notification information obtained by obtainer 11. The first notification is, for example, a sound notification. The first notification control signal is a signal for causing the first notification to be provided intermittently or repeated at least once. When the first notification is a sound notification, the first notification control signal is a signal for causing speaker 20 to repeat the sound notification at least once. Note that the first notification control signal may be a signal that includes a control for causing a sound notification to be repeatedly provided, or may be a signal that includes a control for causing a sound notification to be provided in line with the sound notification that is repeatedly provided.

Sound notification controller 12 also obtains response information that is based on an action performed by user U in response to the first notification (such response information is also referred to as first response information) and determines whether the first response information is in response to the notification information. The response information is information indicating that user U has provided a response. The response information is implemented in one of predetermined forms. The first response information is response information to speaker 20 that has provided the first notification. Here, an example case will be described where sound notification controller 12 obtains, as the first response information, a sound signal representing the voice uttered by user U in response to the first notification. Note that sound notification controller 12 may obtain, as the first response information, an operation signal indicating that user U has performed an action to device 40.

The first response information is implemented in one of predetermined forms. For example, the first response information can be implemented in the form of a sound signal representing the voice uttered by user U, or can be implemented in the form of a signal indicating that user U has performed an action to device 40. Another example of the first response information will be described later.

In obtaining the first response information and determining whether the first response information is in response to the notification information, sound notification controller 12 does so by obtaining the first response information within predetermined time (which corresponds to first predetermined time) after the first notification is provided. When determining that the first response information is in response to the notification information, sound notification controller 12 sends a notification start signal. Here, the first predetermined time has a time length that is specified depending on the form in which the first response information is implemented. When the first response information is implemented in the form of a sound signal representing the voice uttered by user U, for example, the first predetermined time is on the order of few seconds or on the order of one minute or shorter. When the first response information is implemented in the form of a signal indicating that user U has performed an action to device 40, the first predetermined time is longer than the above lengths, and thus may be on the order of few minutes or on the order of ten minutes or shorter.

Image notification controller 13 is a functional unit that controls an image notification. Image notification controller 13 sends a second notification control signal for causing terminal 30 to provide a second notification that indicates the details of the foregoing notification information and that is implemented in a form different from the form of the first notification, when sound notification controller 12 determines that the first response information is not in response to the notification information. The second notification is, for example, an image notification. The second notification control signal is a signal for causing the second notification to be provided intermittently or repeated at least once. When the second notification is an image notification, the second notification control signal is a signal for causing the image notification, i.e., the image display to continue to be displayed.

Image notification controller 13 also obtains response information that is based on an action performed by user U in response to the second notification (such response information is also referred to as second response information) and determines whether the response information is in response to the notification information. The second response information is response information to terminal 30 that has provided the second notification. Here, an example case will be described where image notification controller 13 obtains, as the second response information, an operation signal relating to an operation performed by user U on terminal 30 in response to the second notification. Note that image notification controller 13 may obtain, as the second response information, a signal indicating that user U has performed an action to device 40. Another example of the second response information will be described later.

Canceller 14 is a functional unit that sends a cancellation process signal for cancelling the first notification performed by speaker 20 and the second notification performed by terminal 30. Upon receipt of the cancellation process signal, speaker 20 or terminal 30 performs a cancellation process of cancelling the first notification or the second notification currently provided. Canceller 14 sends a cancellation process signal for cancelling the first notification and the second notification performed by speaker 20 and terminal 30 indicating the details of the notification information, when sound notification controller 12 determines that the first response information is in response to the notification information or when image notification controller 13 determines that the second response information is in response to the notification information. The cancellation process signal may be a control signal for deleting the image notification displayed by terminal 30 or may be a control signal for cancelling notifications repeatedly provided by speaker 20 and terminal 30.

Note that sound notification controller 12 may send, to image notification controller 13, a notification start signal for causing image notification controller 13 to send a second notification control signal, when determining that the first response information is not in response to the notification information.

Note that sound notification controller 12 may resend the first notification control signal when determining, within predetermined time (which corresponds to second predetermined time) after the first notification is provided, that neither the first response information nor the second response information is in response to the notification information. In this case, canceller 14 sends a cancellation process signal when the first response information, which is based on an action performed by user U in response to the first notification control signal resent, is determined as having been obtained. Here, the second predetermined time is longer than the first predetermined time.

The first notification may include one of the items of predetermined notification information, and the second predetermined time may be defined as having a time length that is specified in accordance with the details of the first notification. For example, when device 40 is a washing machine and the notification information indicates that washing has finished, the second predetermined time can be defined as a time length on the order of a few minutes to an hour. When device 40 is a microwave oven and the notification information indicates that warming up of the food has finished, the second predetermined time can be defined as a time length on the order of a few seconds to one minute. Further, the second predetermined time can also be a time length on the order of one minute to ten minutes to remind the user who is about to forget about the notification. When device 40 is a vacuum cleaner and the notification information indicates that the amount of dust in the dust box or the dust bag inside of the vacuum cleaner has exceeded a threshold (e.g., 70%) and almost full, the second predetermined time can be defined as a time length on the order of a few hours to one day.

In one example, sound notification controller 12 corresponds to the first notification controller and image notification controller 13 corresponds to the second notification controller. In this case, the first device corresponds to speaker 20 and the first notification corresponds to a sound notification. Also, the second device corresponds to terminal 30 and the second notification corresponds to an image notification.

In another example, sound notification controller 12 may also be configured to correspond to the second notification controller and image notification controller 13 may also be configured to correspond to the first notification controller. In this case, the first notification corresponds to an image notification and the second notification corresponds to a sound notification.

In further another example, device 40 may correspond to the first device or the second device.

The following describes forms of notifications to be provided under the control of notification control device 10 and the timing of providing the notifications.

Figure 2:
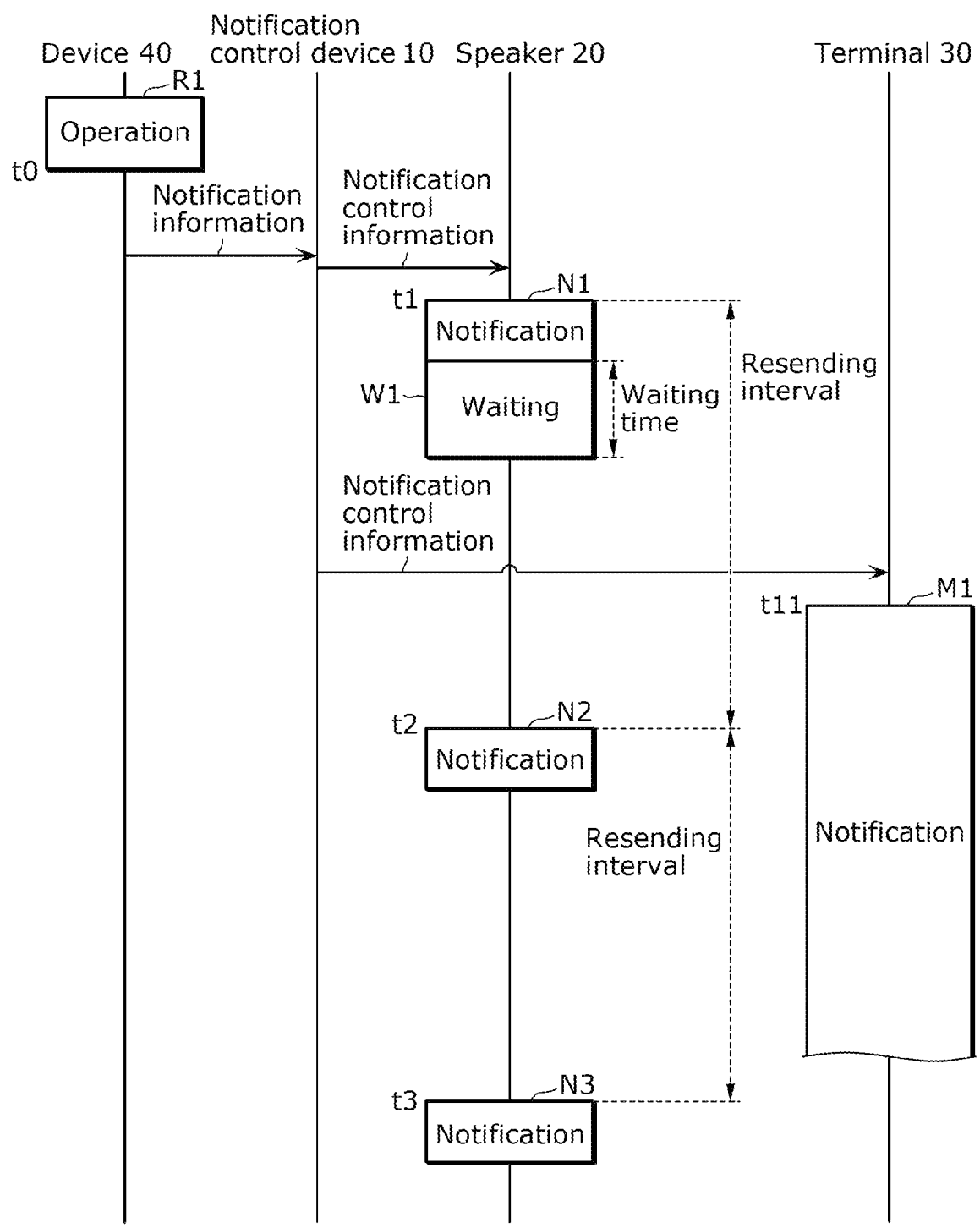
FIG. 2 is an explanatory diagram showing notifications to be provided under the control of the notification control device according to the embodiment.

FIG. 2 is an explanatory diagram showing notifications to be provided under the control of notification control device 10 according to the present embodiment.

More specifically, FIG. 2 shows in time series exemplary processes, etc., performed by speaker 20 and terminal 30, of providing notifications under the control of notification control device 10 in the case where user U does not respond to the notification.

Suppose that device 40 finishes operation R1 at time to. Device 40 sends, to notification control device 10, notification information indicating that operation R1 has finished.

Obtainer 11 of notification control device 10 obtains the notification information sent by device 40. Sound notification controller 12 sends first notification control information to speaker 20, thereby performing a control of causing speaker 20 to provide sound notification N1 indicating the notification information obtained by obtainer 11. As a result, speaker 20 provides notification N1 at time t1.

Sound notification controller 12 waits for receiving response information (waiting W1 in FIG. 2) that is based on an action performed by user U in response to notification N1.

Waiting W1 is performed during a period within predetermined waiting time after the control of the notification by speaker 20 is performed (which corresponds to the first predetermined time). When determining that sound notification controller 12 has not received the first response information within such waiting time, image notification controller 13 sends second notification control information to terminal 30, thereby performing control of causing terminal 30 to provide image notification M1 indicating the notification information. As a result, terminal 30 provides notification M1 at time t11.

When sound notification controller 12 determines that the first response information and the second response information have not been received within a predetermined resending interval after notification N1 is provided (such predetermined resending interval corresponds to the second predetermined time), a cancellation process signal is not to be sent to speaker 20. Speaker 20 thus sends notification N2, which is notification N1 resent.

After that, when sound notification controller 12 determines that the first response information and the second response information have not been received within the predetermined resending interval after notification N2 is provided, a cancellation process signal is not to be sent to speaker 20. Speaker 20 thus provides notification N3, which is notification N1 resent for the second time. After that, speaker 20 repeats resending notification N1. Note that the resending may be cancelled when the number of times of resending reaches a predetermined number of times of resending (5 times, 10 times, etc.).

As described above, notification control device 10 provides an image notification when user U does not respond to a sound notification which has been provided, and performs a control of causing the sound notification to be resent. With this, it is possible to attract an attention of user U by the first sound notification, thereby enabling user U to receive the notification. Also, when user U fails to receive such sound, it is possible to enable user U to receive the notification in the form of an image notification. Further, the resending of the sound notification is repeated after that, thereby attracting an attention of user U to enable user U to receive the notification by the combined use of an image notification. Since a series of the foregoing processes are performed while waiting for the obtainment of response information from user U, it can be possible to prevent user U from being annoyed. As described above, notification control device 10 enables a notification to be appropriately provided from device 40 to user U.

Figure 3:
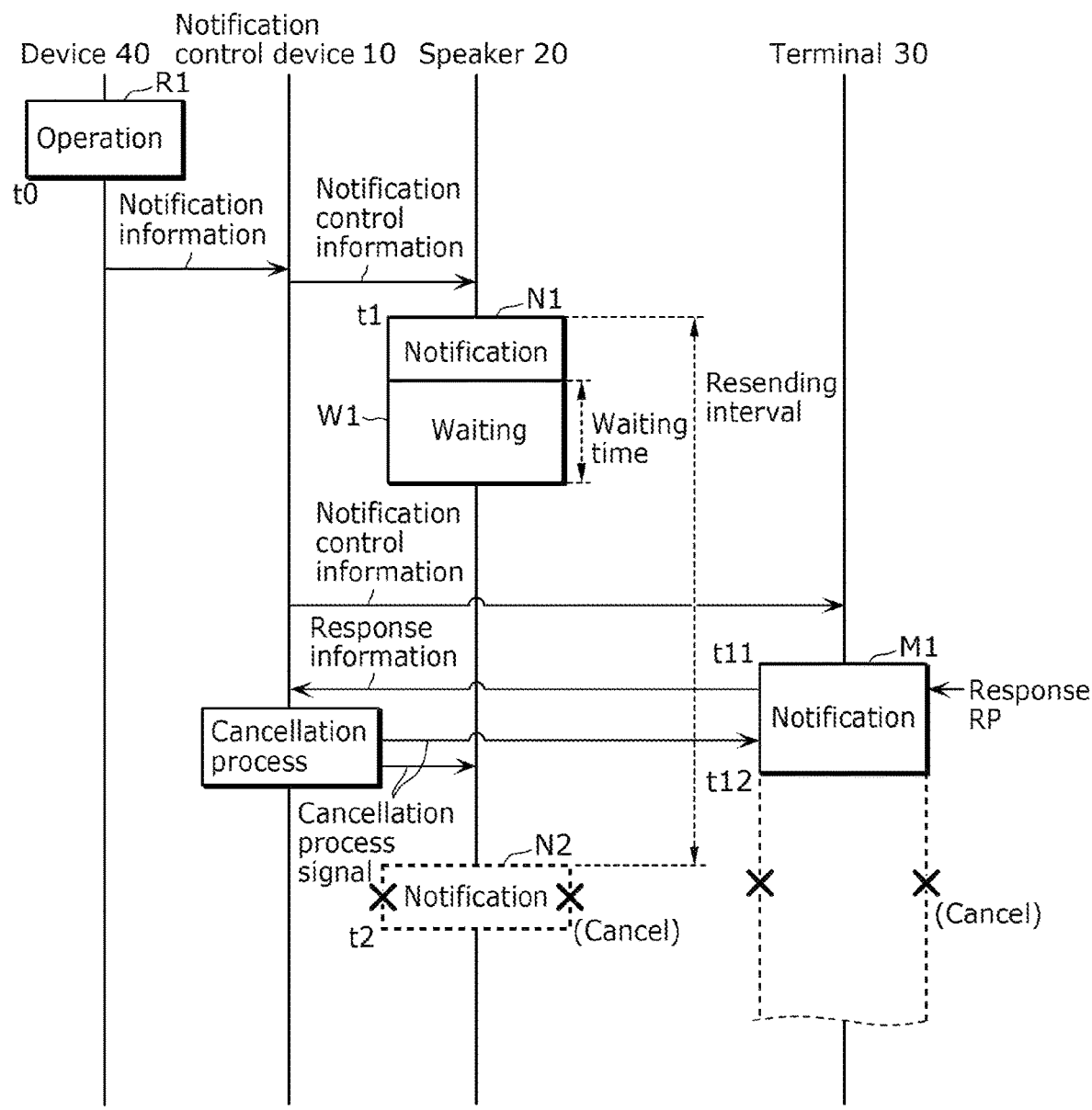
FIG. 3 is a first explanatory diagram showing notifications to be cancelled by a cancellation process according to the embodiment.

FIG. 3 is a first explanatory diagram showing notifications to be cancelled by a cancellation process according to the present embodiment.

More specifically, FIG. 3 shows in time series processes performed by speaker 20 and terminal 30 in the case where user U responds to an image notification in processes, etc. performed by speaker 20 and terminal 30 under the control of notification control device 10.

The processes performed by speaker 20 of providing notification N1 and performed by terminal 30 of providing notification M1 under the control of notification control device 10 shown in FIG. 3 are the same as the processes shown in FIG. 2.

Suppose that user U provides response RP after that by operating the image on terminal 30.

Upon receipt of response RP from user U, terminal 30 generates response information and sends it to image notification controller 13. Image notification controller 13 receives the response information from terminal 30. In response to this, canceller 14 sends, to each of speaker 20 and terminal 30, a cancellation process signal for cancelling the sound notification and the image notification. As a result of sending the cancellation process signals, the image notification and notification N2, which is the sound notification resent, at time t12 and after will be cancelled. Note that upon receipt of response RP from user U, terminal 30 may perform a cancellation process of cancelling the image notification and generate, as response information, the details indicating that the cancellation process has been performed.

Figure 4:
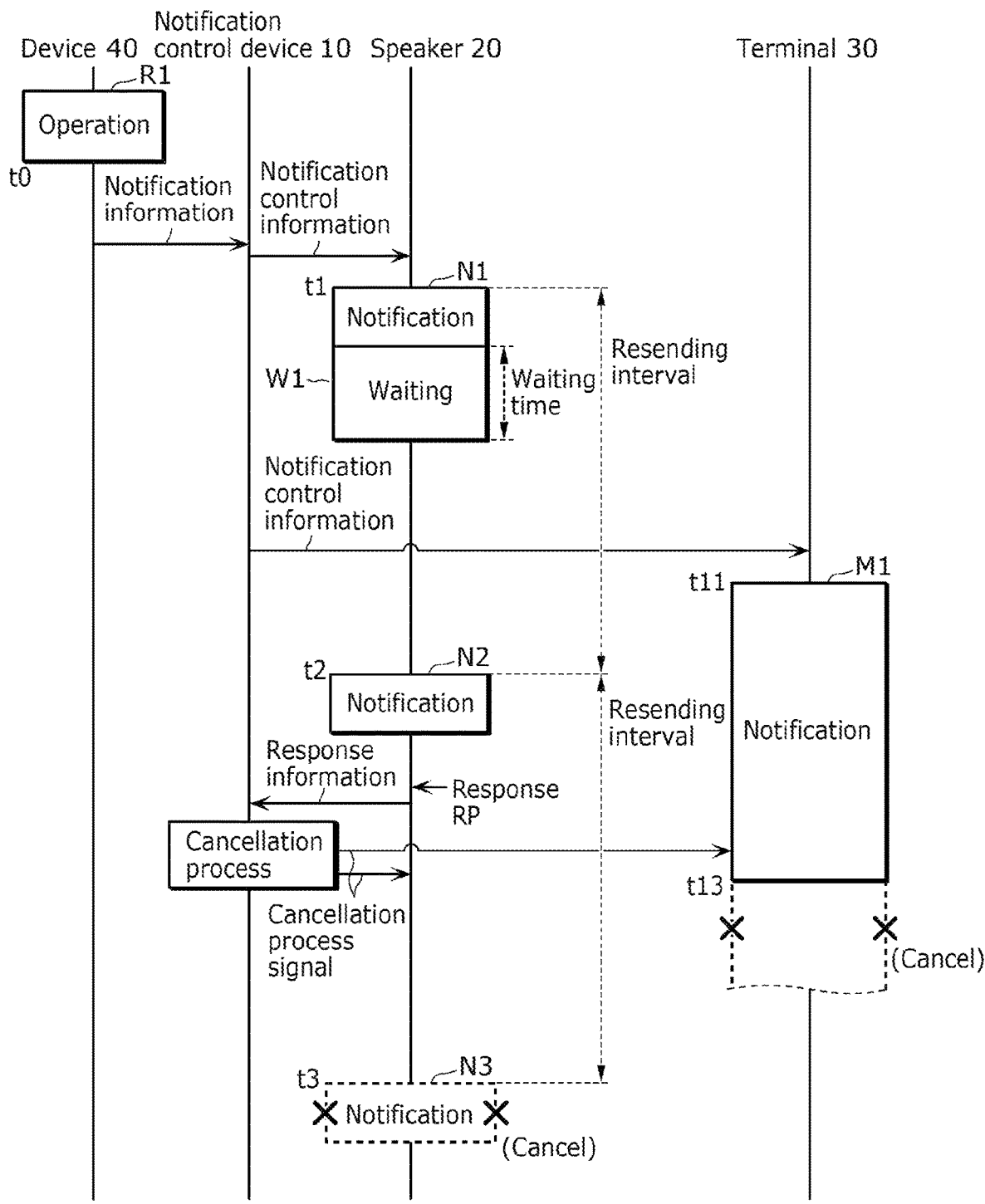
FIG. 4 is a second explanatory diagram showing notifications to be cancelled by the cancellation process according to the embodiment.

FIG. 4 is a second explanatory diagram showing notifications to be cancelled by the cancellation process according to the present embodiment.

More specifically, FIG. 4 shows in time series processes performed by speaker 20 and terminal 30 in the case where user U responds to a sound notification in processes, etc., performed by speaker 20 and terminal 30, of providing notifications under the control of notification control device 10.

The processes performed by speaker 20 of providing notification N1, by terminal 30 of providing notification M1, and by speaker 20 of providing notification N2 shown in FIG. 4 under the control of notification control device 10 are the same as the processes shown in FIG. 2.

Suppose that user U provides response RP by voice after that.

Upon receipt of response RP from user U, speaker 20 generates response information and sends it to sound notification controller 12. Sound notification controller 12 receives the response information from speaker 20. In response to this, canceller 14 sends a cancellation process signal to each of speaker 20 and terminal 30 to perform a cancellation process of cancelling the sound notification and the image notification. As a result of the cancellation process, the image notification and notification N3, which is the sound notification resent, at time t13 and after will be cancelled.

The following describes various examples of the cancellation process.

Figure 5:
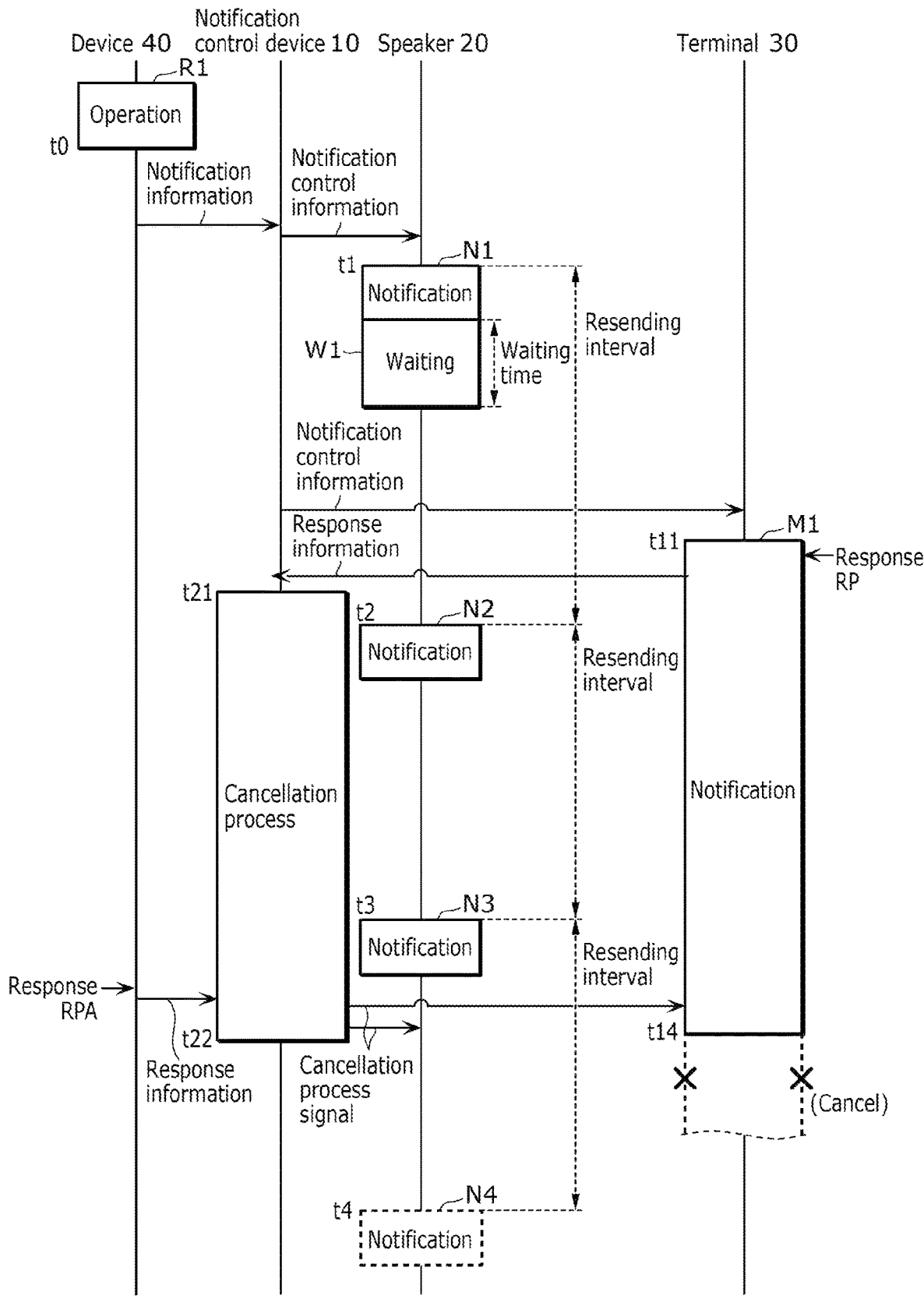
FIG. 5 is an explanatory diagram showing an exemplary cancellation process according to the embodiment.

In the cancellation process, the sound notification and the image notification may be immediately cancelled as described above. In the cancellation process, the sound notification and the image notification may also be cancelled after waiting for a predetermined condition to be satisfied. With reference to FIG. 5, the following describes processes performed by speaker 20 and terminal 30 in the case of cancelling notifications after waiting for the predetermined condition to be satisfied.

Here, the predetermined condition may be, for example, that predetermined time (on the order of few seconds to a few minutes) elapses after the cancellation process is started or that response information is received indicating that a predetermined type of response has been received. The predetermined type of response is implemented in a form, for example, in which user U performs an action to device 40 relating to the notification information (see (d) of FIG. 8 to be described later). FIG. 5 shows such exemplary case.

FIG. 5 is an explanatory diagram showing an exemplary cancellation process according to the present embodiment.

More specifically, FIG. 5 shows in time series processes performed by speaker 20 and terminal 30 in the case where user U responds to an image notification in processes, etc., performed by speaker 20 and terminal 30, of providing notifications under the control of notification control device 10.

In FIG. 5, the processes up until when user U provides response RP are the same as those shown in FIG. 3.

Upon receiving, from terminal 30, response information indicating that user U has provided response RP by voice, notification control device 10 starts the cancellation process (time t21). At this point in time, notification control device 10 causes the sound notification and the image notification to continue without cancelling them.

Suppose that sound notifications N2 and N3 are provided after that under the control of sound notification controller 12, after which user U provides response RPA. Response RPA is a response that is provided by performing an action to device 40. Device 40 sends, to notification control device 10, response information indicating that user U has provided response RPA. Note that the response information is not limited to being sent from device 40, and thus may be sent from speaker 20 or terminal 30.

When the response information is received, in the middle of the cancellation process, indicating that user U has provided response RPA, canceller 14 sends a cancellation process signal to each of speaker 20 and terminal 30, thereby cancelling the sound notification and the image notification (time t22). As a result of the cancellation process, the image notification and notification N4, which is the sound notification resent, at time t14 and after will be cancelled.

Stated differently, when image notification controller 13 obtains, as the second response information, a signal indicating that user U has performed an action to device 40, canceller 14 sends a cancellation process signal that is a signal to be sent when image notification controller 13 obtains an operation signal as the second response information.

The foregoing cancellation process is applicable to a cancellation process that is performed when sound notification controller 12 obtains a sound signal as the first response information. Stated differently, when sound notification controller 12 obtains, as the first response information, an operation signal indicating an operation performed on device 40 in response to the second notification, canceller 14 is also capable of sending a cancellation process signal, which is a signal to be sent when sound notification controller 12 obtains a sound signal as the first response information.

With this, notification control device 10 enables a notification to be more reliably provided to user U while prompting user U to perform an action to device 40 on the basis of such notification. When user U provides a response by voice or a response by performing an operation on the image in response to the notification, it is unknown whether user U will actually perform an action to device 40. In view of this, the notification is continued until when it is confirmed that user U has actually performed an action to device 40 and is to be cancelled after it is confirmed that user U has actually performed an action to device 40. With this, it is possible to more strongly prompt user 40 to actually perform an action to device 40.

Figure 6A:
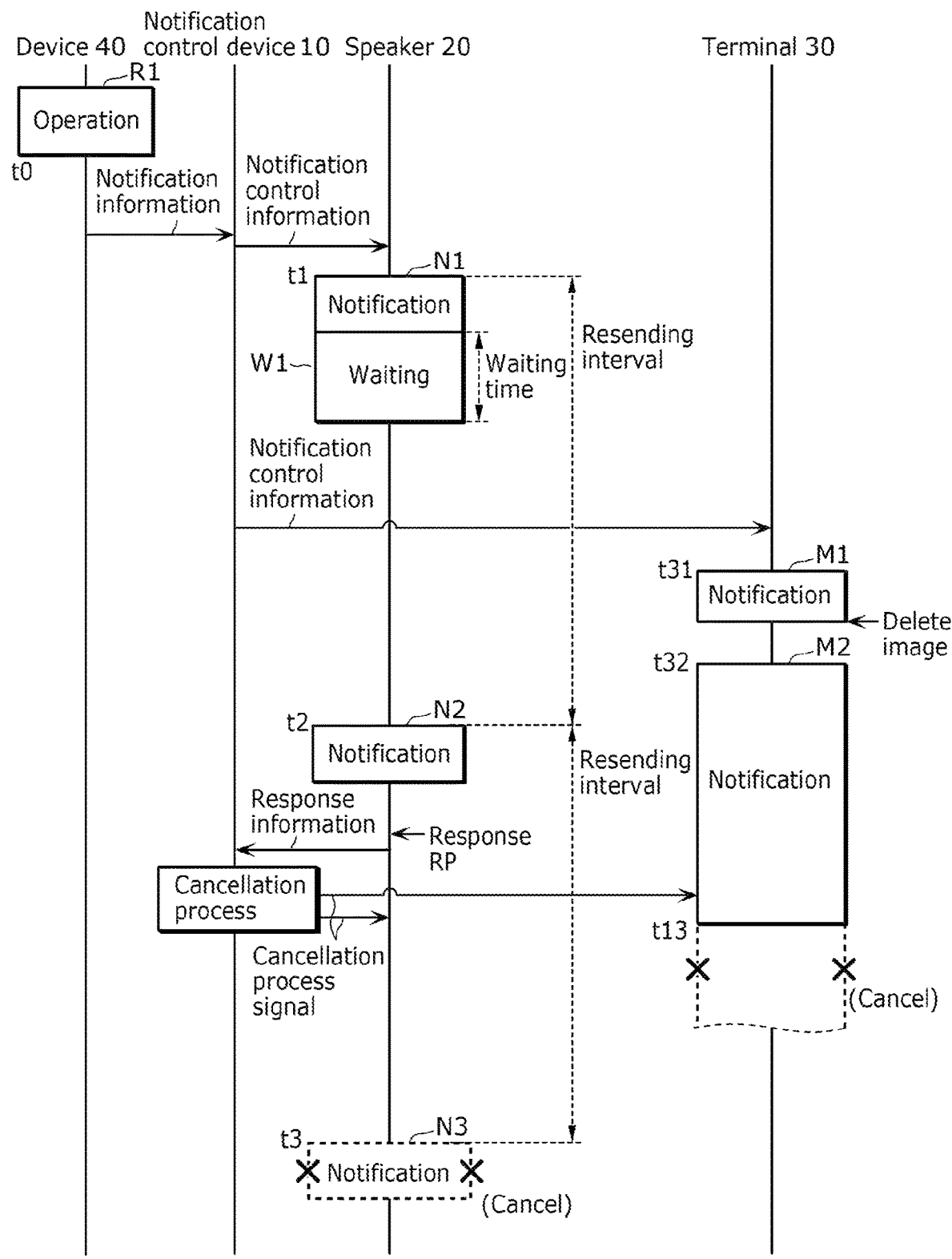
FIG. 6A is an explanatory diagram showing a first example of image notifications according to the embodiment.
Figure 6B:
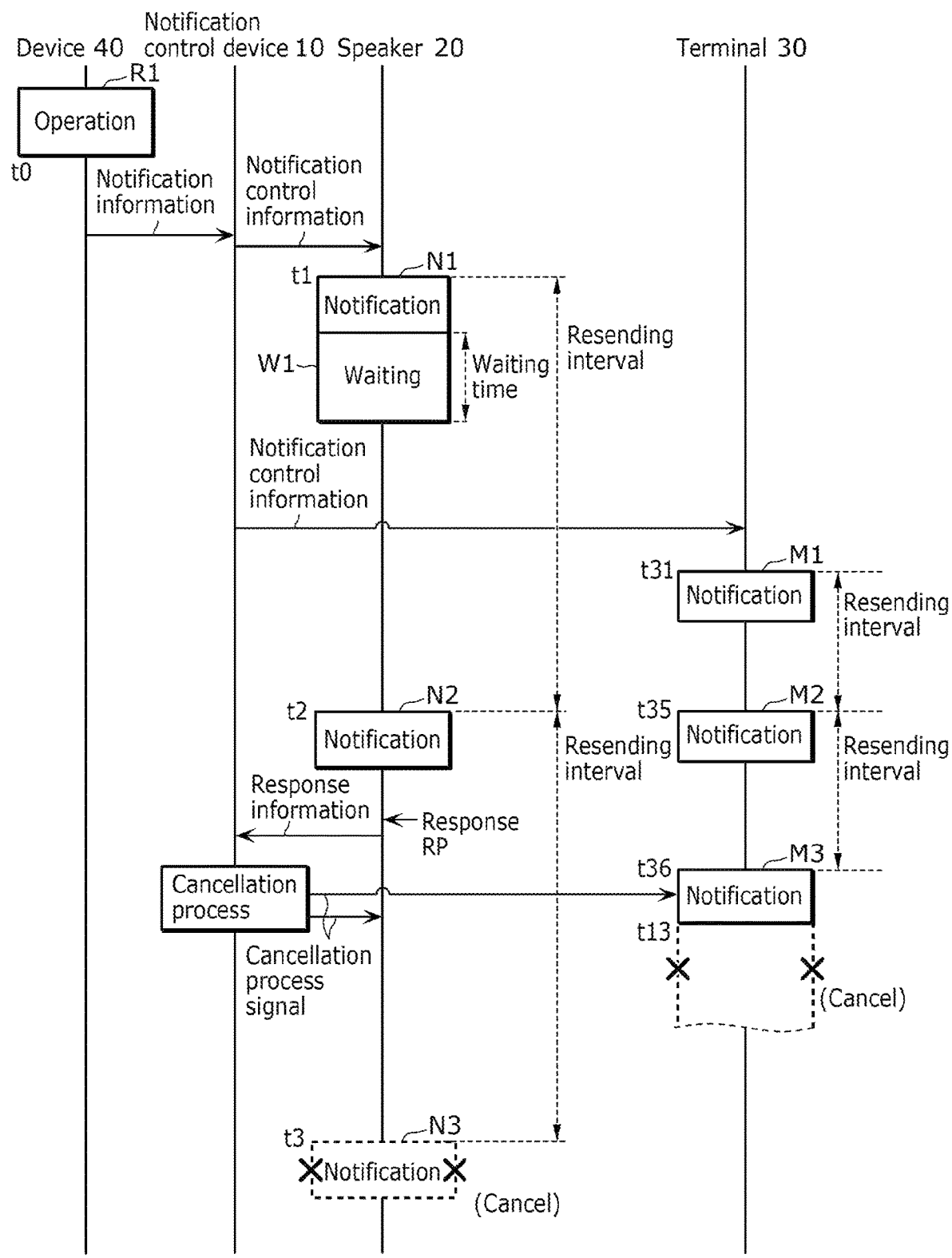
FIG. 6B is an explanatory diagram showing a second example of image notifications according to the embodiment.

FIG. 6A and FIG. 6B are explanatory diagrams showing exemplary image notifications according to the present embodiment. FIG. 6A shows in time series exemplary image notifications that are provided under the control of notification control device 10. Note that the process performed by terminal 30 shown in FIG. 6A is different from that shown in FIG. 4. The processes other than the process of terminal 30 shown in FIG. 6A are the same as those shown in FIG. 4.

Image notification controller 13 causes an image to be displayed on the screen of terminal 30, thereby providing a notification as described above.

In principle, image display is performed by starting to display an image on the screen of terminal 30 and continuing such display. However, when terminal 30 permits an operation of deleting the image, the image notification is to be stopped by user U performing an operation. The following describes a technique of more appropriately providing an image notification in such case.

FIG. 6A shows the case where terminal 30 starts image notification M1 at time t31 under the control of image notification controller 13, after which user U performs an operation to delete the image relating to notification M1.

In this case, image notification controller 13 performs again the control of causing an image notification to be provided after the image is deleted. As a result, terminal 30 provides again image notification M2 at predetermined time t32 that is after the image is deleted. For example, image notification controller 13 monitors whether the image relating to the notification is displayed, and when detecting that such image is not displayed, causes the image to be displayed again, thereby achieving the foregoing display.

The image notification is to be cancelled after that when user U provides response RP, which is the same as described above.

With this, it is possible for notification control device 10 to continue the image notification by restarting it, when the image notification by terminal 30 is cancelled.

Meanwhile, the mere continuation of image display cannot newly attract an attention of user U, thus failing in some cases to make user U be aware of the image display. The following describes a technique of more appropriately providing an image notification in such case.

FIG. 6B shows the case where terminal 30 starts image notification M1 at time t31 under the control of image notification controller 13.

Here, when terminal 30 continues to display the image, i.e., when the image is only kept being displayed without any changes, user U will possibly pay no attention to the screen of terminal 30.

In this case, image notification controller 13 causes the image displayed on terminal 30 to be deleted once, and causes notification M2 to be provided after that by causing the image to be displayed again (time t35). Thereafter, image notification controller 13 causes the image displayed on terminal 30 to be deleted once, and causes notification M3 to be provided after that by causing the image to be displayed again (time t36). Displaying the image repeatedly in the above manner corresponds to resending the image notification.

The image notification is to be cancelled after that when user U provides response RP, which is the same as described above.

With this, it is possible to provide an image notification to user U while newly attracting an attention of user U, thereby being able to prompt user U to be aware of the image display.

Figure 6C:
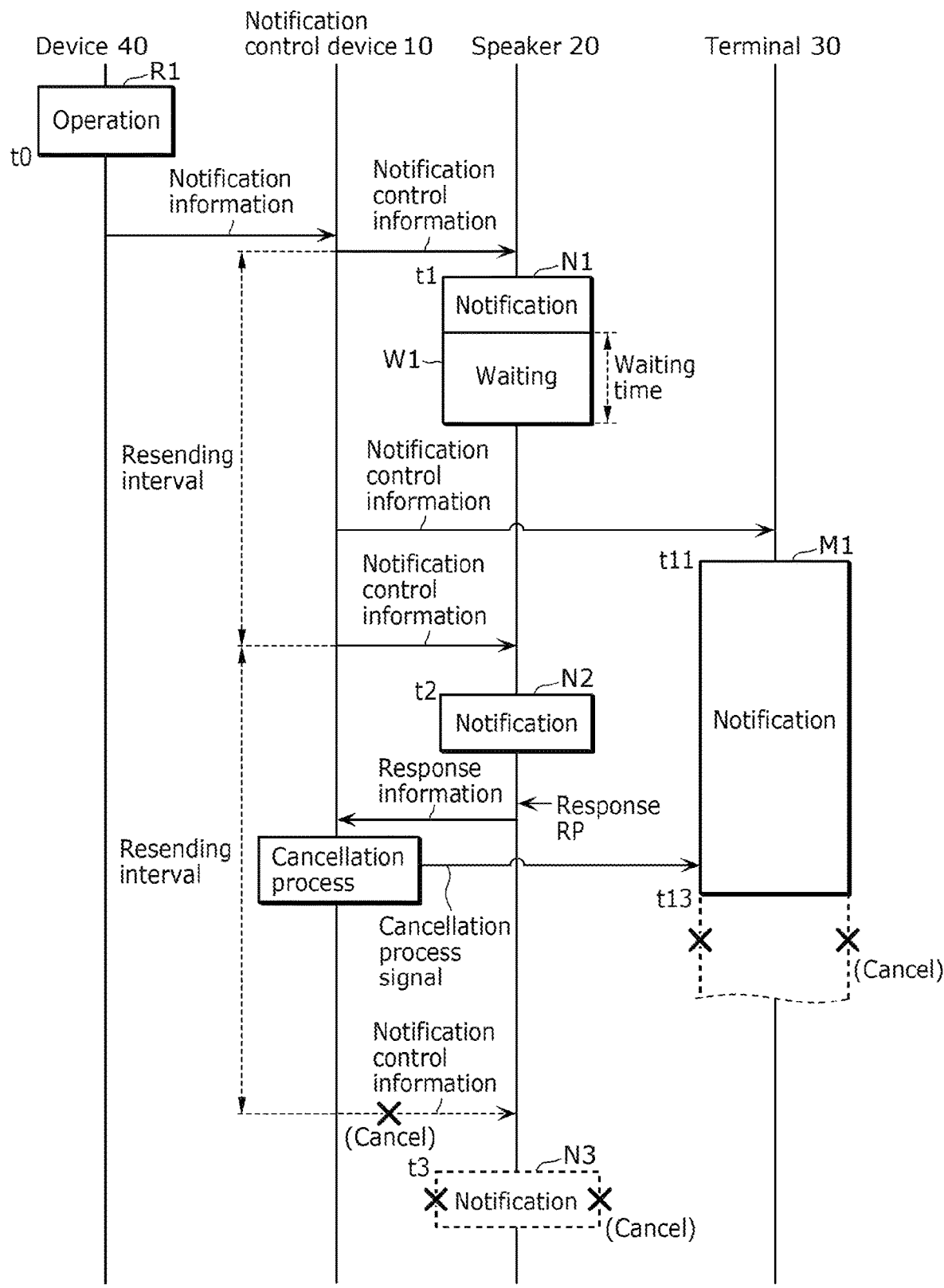
FIG. 6C is an explanatory diagram showing exemplary sound notifications according to the embodiment.

FIG. 6C is an explanatory diagram showing exemplary sound notifications according to the present embodiment.

FIG. 6C shows in time series exemplary sound notifications that are provided under the control of notification control device 10. Note that the processes performed by notification control device 10 and speaker 20 shown in FIG. 6C are different from those shown in FIG. 4. The other processes are the same as those shown in FIG. 4.

As shown in FIG. 6C, notification control device 10 sends notification control information at the resending intervals of speaker 20, thereby controlling the timing at which speaker 20 performs a notification. Speaker 20 receives the notification control information sent from notification control device 10, and performs notifications (more specifically, notifications N1 and N2) every time speaker 20 receives the notification control information.

In this case, when receiving response information, notification control device 10 does not send a cancellation process signal to speaker 20. Stated differently, a cancellation process signal is prohibited from being sent to speaker 20. This is because speaker 20 does not provide a notification when notification control device 10 does not send notification control information, meaning that it is possible for notification control device 10 to cancel a notification (more specifically, notification N3) provided by speaker 20 by not sending notification control information.

With this, it is possible to cancel an image notification and a sound notification after speaker 20 receives response RP from user U.

When notification control device 10 and speaker 20 are supposed to perform the processes shown in FIG. 4, speaker 20 needs to have a timer function for providing a plurality of notifications at the resending intervals and a function for cancelling the plurality of notifications provided, upon receipt of a cancellation process signal.

Meanwhile, when notification control device 10 and speaker 20 are supposed to perform the processes shown in FIG. 6C, speaker 20 is simply required to have a function for providing a notification for every receipt of notification control information. This achieves a simpler functional configuration. Also, when notification control device 10 is configured to control notifications performed by a plurality of speakers 20, there is an advantage of being able to change operations relating to notifications performed by a plurality of speaker 20 by modifying a program possessed by notification control device 10.

Figure 7:
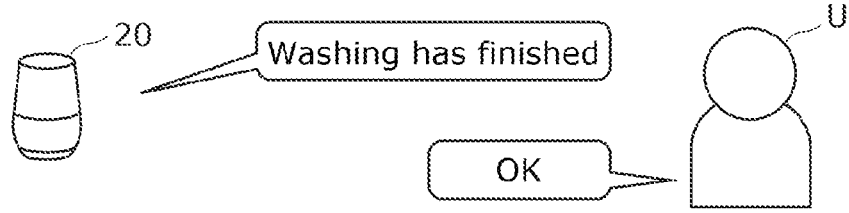
FIG. 7 is a first explanatory diagram showing variational forms of a response provided by a user according to the embodiment.
Figure 7:
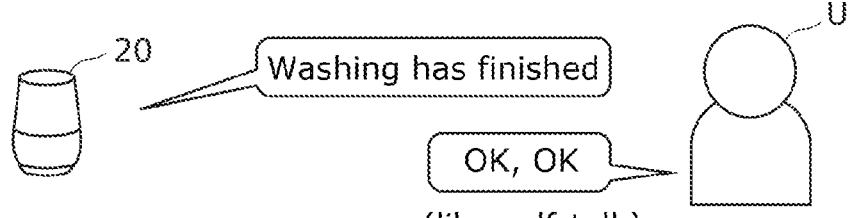
Figure 7:
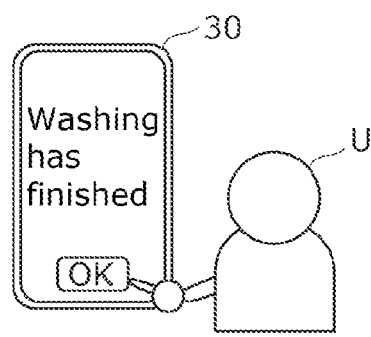
Figure 8:
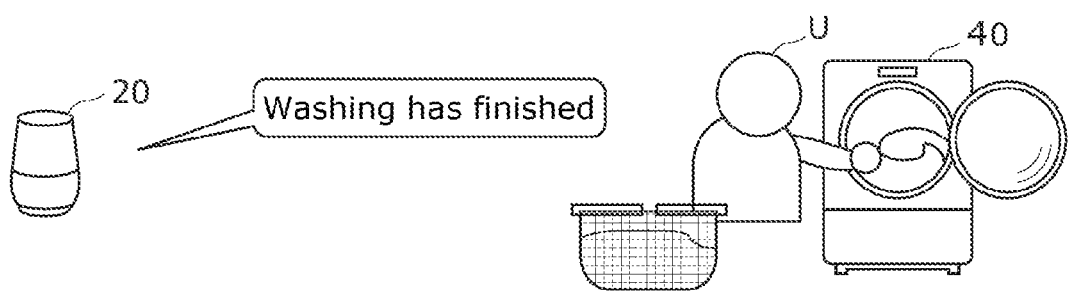
FIG. 8 is a second explanatory diagram showing variational forms of a response provided by the user according to the embodiment.
Figure 8:
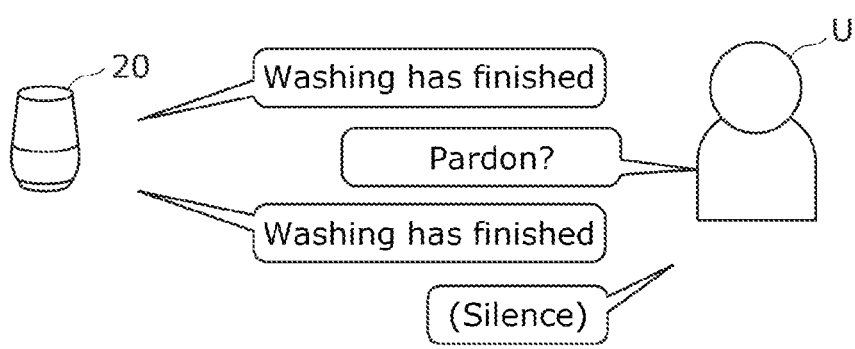

FIG. 7 and FIG. 8 are explanatory diagrams showing variational forms of a response provided by user U according to the present embodiment.

Sound notification controller 12 or image notification controller 13 is capable of processing the voice, an operation, or an action of user U described below as a response.

(a) in FIG. 7 shows an exemplary response by voice that is explicitly provided.

More specifically, speaker 20 provides a sound notification saying "washing has finished", in response to which user U provides a response by voice saying "OK". The response "OK" is an explicit response to the notification. In addition to this, the response may be a phrase having a positive meaning such as "all right", "roger", etc.

In this case, sound notification controller 12 is able to determine that user U has provided a positive response to the sound notification.

(b) in FIG. 7 shows an exemplary response by voice that is not explicitly provided.

More specifically, speaker 20 provides a sound notification saying "washing has finished", in response to which user U provides a response by voice saying "OK, OK" as if talking to him/herself. Here, the voice saying "OK, OK" is not a response explicitly provided to the notification, but the voice "OK, OK" uttered by user U as if talking to him/herself in a situation where the notification has been provided can be construed as an implication that user U accepts the notification. In addition to the above, the response may also be a phrase that implies that user U has accepted the notification such as "OK, I'll get started" uttered as if talking to him/herself.

In this case, sound notification controller 12 is able to determine that user U has provided a positive response to the sound notification.

(c) in FIG. 7 shows an exemplary response to an image.

More specifically, terminal 30 provides an image notification by displaying, on the screen, an image that includes a character string "washing has finished, in response to which user U provides a response by operating the icon with a character sting "OK".

In this case, sound notification controller 12 is able to determine that user U has provided a positive response to the image notification.

(d) in FIG. 8 shows an exemplary response provided by user U by performing an action to device 40.

More specifically, speaker 20 provides a sound notification saying "washing has finished", in response to which user U provides a response by performing an action of opening the door of the laundry tub of the washing machine, which is device 40, and taking out the laundry.

In this case, when a sensor detects that the door of the laundry tub has been opened or the weight of the laundry inside of the laundry tub is decreasing, device 40 sends the result of such detection to notification control device 10. Obtainer 11 of notification control device 10 receives the result of the detection from device 40 and transfers it to sound notification controller 12. Sound notification controller 12 is able to determine that user U has provided a positive response to the sound notification. Note that (d) in FIG. 8 is applicable to a response to an image notification by terminal 30.

(e) in FIG. 8 shows an exemplary non-response to a notification that is provided again after being begged to do so.

More specifically, speaker 20 provides a sound notification saying "washing has finished", and user U, who has failed to recognize such voice, says "pardon?". To this, speaker 20 provides again a sound notification saying "washing has finished", in response to which user U says nothing (i.e., non-response).

In this case, the reason that user U does not respond to the second sound notification despite that user U has begged for the first sound notification to be provided again is probably because user U has been able to recognize the second sound notification. As such, sound notification controller 12 is able to determine that user U has provided a positive response to the sound notification.

The following describes processes performed by notification control device 10 with the above configuration (such processes are also referred to as a notification control method).

Figure 9:
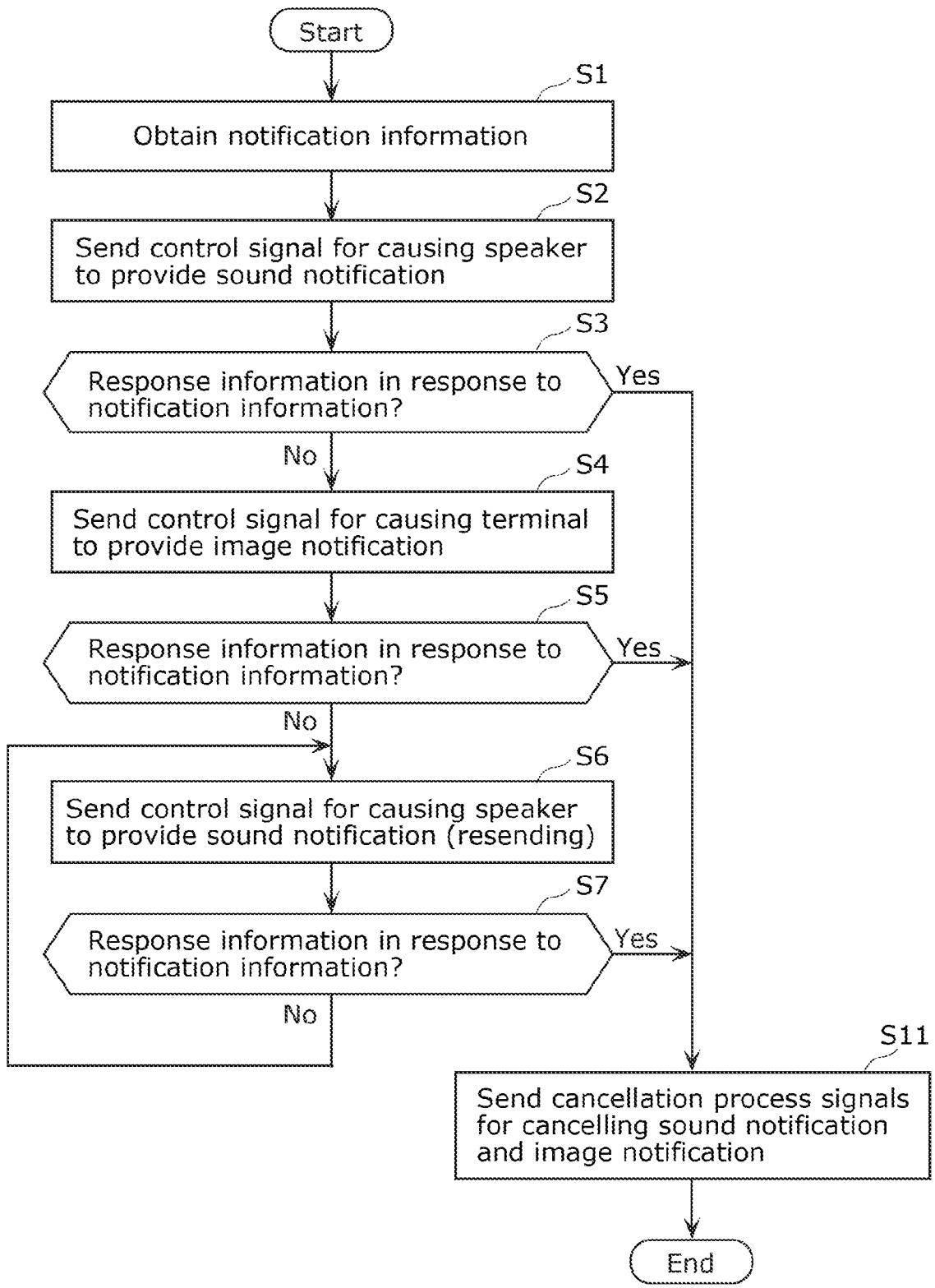
FIG. 9 is a flowchart of processes performed by the notification control device according to the embodiment.

FIG. 9 is a flowchart of the processes performed by notification control device 10 according to the present embodiment.

In step S1, obtainer 11 obtains notification information relating to an operation of device 40.

In step S2, sound notification controller 12 sends a control signal (first notification control signal) for causing speaker 20 to provide a sound notification indicating the details of the notification information obtained in step S1.

In step S3, sound notification controller 12 obtains response information that is based on an action performed by user U in response to the sound notification by speaker 20 that is provided on the basis of the control signal sent in step S2. Sound notification controller 12 determines whether the obtained response information is in response to the notification information. When determining that the response information is in response to the notification information (Yes in step S3), the process proceeds to step S11. In the other case (No in step S3), the process proceeds to step S4.

In step S4, image notification controller 13 sends a control signal (second notification control signal) for causing terminal 30 to provide an image notification indicating the details of the notification information obtained in step S1.

In step S5, image notification controller 13 obtains response information that is based on an action performed by user U in response to the image notification by terminal 30 that is provided on the basis of the control signal sent in step S4. Image notification controller 13 determines whether the obtained response information is in response to the notification information. When determining that the response information is in response to the notification information (Yes in step S5), the process proceeds to step S11. In the other case (No in step S5), the process proceeds to step S6.

In step S6, sound notification controller 12 sends a control signal for causing speaker 20 to provide (i.e., resend) a sound notification indicating the notification information obtained in step S1.

In step S7, sound notification controller 12 obtains response information that is based on an action performed by user U in response to the sound notification by speaker 20 that is provided on the basis of the control signal sent in step S6. Sound notification controller 12 determines whether the obtained response information is in response to the notification information. When determining that the response information is in response to the notification information (Yes in step S7), the process proceeds to step S11. In the other case (No in step S7), the process proceeds to step S6.

In step S11, canceller 14 sends cancellation process signals for cancelling the sound notification provided by sound notification controller 12 and the image notification provided by image notification controller 13. When step S11 ends, a series of processes shown in FIG. 9 ends.

Through a series of processes shown in FIG. 9, the notification control device enables the notification to be appropriately provided from the device to the user.

Note that speaker 20 may include a controller so that sound notification controller 12 sends, to the controller of speaker 20, only a signal for instructing speaker 20 to perform an operation. Similarly, terminal 30 may include a controller so that image notification controller 13 sends, to the controller of terminal 30, only a signal for instructing terminal 30 to perform an operation.

Note that in the present embodiment, an exemplary case has been described in which the first device and the second device are different devices, but the first device and the second device may be implemented as two functions in a single device. For example, the present disclosure may have a configuration in which the sound output-related function of a television receiver corresponds to the first device and the video output-related function of the television receiver corresponds to the second device.

[Variation]

An embodiment has been described above in which whether user U has responded to notification information is determined on the basis of whether sound notification controller 12 or image notification controller 13 has received response information from speaker 20 or terminal 30, but the present disclosure is not limited to such embodiment.

The present disclosure may be implemented, for example, as an embodiment in which sound notification controller 12 receives sound information obtained by speaker 20 and analyzes the received sound information to determine whether user U has responded to the notification information. Similarly, the present disclosure may be implemented as an embodiment in which image notification controller 13 receives operation information of terminal 30 and analyzes the received operation information to determine whether user U has responded to the notification information.

As described above, the notification control device according to the present embodiment provides the second notification when the user does not respond to the first notification which has been provided. The notification control device utilizes notifications in two different forms in consideration of whether the user has provided a response. This circumvents situations such as where the same notification is provided to the user again who already recognizes the details of such notification and the notification implemented in a form which the user cannot receive is repeatedly provided. With this, it is possible for the notification control device to enable the notification to be appropriately provided from the device to the user. This also provides the effects of being able to prevent an increase in processing load and power consumption in a device used for notifications as well as preventing the user from being annoyed.

Further, since the time to wait until response information is obtained after the first notification is provided is specified depending on the form in which such notification information is implemented, it is possible for the notification control device to adjust the timing of providing the second notification in accordance with the form of the response information. Adjusting the timing of providing the second notification, the notification control device enables the notification to be more appropriately provided from the device to the user.

Also, the notification control device further resends the first notification when the user responds neither to the first notification nor the second notification provided. This enables the user who has failed to being notified by the foregoing notifications to receive the notification that has been resent. It is also possible to prevent the same notification to be provided again to the user who has provided a response upon receiving the notification. Resending the first notification, the notification control device enables the notification to be more appropriately provided from the device to the user.

Further, since the time to wait until the time of resending the first notification is specified depending on the details of such notification, it is possible for the notification control device to adjust the timing of resending in accordance with the details of the notification. Adjusting the timing of resending the first notification, the notification control device enables the notification to be more appropriately provided from the device to the user.

Also, the notification control device utilizes sound output as the first notification and image display as the second notification. A sound notification is characterized in that it needs to be received while the sound relating to such notification is being outputted and an image notification is characterized in that it can be received by the user whenever the image continues to be displayed. As such, the use of a notification by sound output and a notification by image display enables the user to more reliably receive the notifications. Using a notification by sound output and a notification by image display, the notification control device enables the notification to be appropriately provided from the device to the user.

Also, the notification control device obtains a response by voice provided by the user in response to sound output performed as the first notification and obtains a response provided by the user by operating the device in response to image display performed as the second notification. Using a response by voice provided by the user and a response provided by the user by operating the device, the notification control device enables the notification to be appropriately provided from the device to the user.

Also, the notification control device obtains, as a response to the first notification, information indicating that the user has performed an action to the device. Using, as a response, that the user has performed an action to the device, the notification control device enables the notification to be appropriately provided from the device to the user.

Also, the notification control device obtains, as a response to the second notification, information indicating that the user has performed an action to the device. Using, as a response, that the user has performed an action to the device, the notification control device enables the notification to be appropriately provided from the device to the user.

Also, the notification control device cancels the notification control after waiting for the user to perform an action to the device, even when the notification control device obtains a response from the user by voice that is provided in response to the sound output provided as the first notification. This prevents the user from forgetting to perform an action to the device after only providing a response by voice. More strongly prompting the user to perform an action to the device, the notification control device enables the notification to be more appropriately provided from the device to the user.

Also, the notification control device cancels the notification control after waiting for the user to perform an action to the device, even when the notification control device obtains a response provided by the user by performing an operation on the image display provided as the second notification.

This prevents the user from forgetting to perform an action to the device after only providing a response by performing the operation. More strongly prompting the user to perform an action to the device, the notification control device enables the notification to be more appropriately provided from the device to the user.

The embodiment has been described above to illustrate the technology of the present disclosure, for which the accompanying drawings and detailed description have been provided.

The structural elements described in the accompanying drawings and detailed description can include not only elements essential to solve the problem, but also elements not essential to solve the problem to illustrate the above technology. The fact that such non-essential elements are illustrated in the accompanying drawings and detailed description thus should not lead to the immediate conclusion that these elements are essential.

Also note that the foregoing embodiment is intended for illustrating the technology according to the present disclosure, and thus allows for various modifications, replacements, additions, omissions, and so forth made thereto within the scope of the claims and its equivalent scope.

INDUSTRIAL APPLICABILITY

The present disclosure is applicable for use as a notification control device that controls a notification provided by a device to a user.

REFERENCE SIGNS LIST 1 notification control system
10 notification control device
11 obtainer
12 sound notification controller
13 image notification controller
14 canceller
20 speaker
30 terminal
40 device
N network
N1, N2, N3, N4, M1, M2, M3 notification
t0, t1, t2, t3, t4, t11, t12, t13, t14, t21, t22, t31, t32, t35, t36 time
R1 operation
RP, RPA response
U user
W1 waiting

The invention claimed is:

1. A notification control device comprising:
an obtainer that obtains notification information relating to an operation performed by a device;
a first notification controller that: sends a first notification control signal for causing a first device to provide a first notification indicating details of the notification information; obtains first response information to the first device that has provided the first notification; and determines whether the first response information is in response to the notification information;
a second notification controller that: sends a second notification control signal for causing a second device to provide a second notification indicating the details of the notification information, when the first notification controller determines that the first response information is not in response to the notification information, the second notification being implemented in a form different from a form of the first notification; obtains second response information to the second device that has provided the second notification; and determines whether the second response information is in response to the notification information; and
a canceller that sends, to the first device and the second device, a cancellation process signal for cancelling the notifications indicating the details of the notification information, when the first notification controller determines that the first response information is in response to the notification information or the second notification controller determines that the second response information is in response to the notification information.

2. The notification control device according to claim 1, wherein the first notification controller resends the first notification control signal when determining, within predetermined time after sending the first notification control signal, that neither the first response information nor the second response information is in response to the notification information.

3. The notification control device according to claim 1, wherein the first notification controller sends, as the first notification control signal, a signal for causing the first device to provide the first notification by sound output, and
the second notification controller sends, as the second notification control signal, a signal for causing the second device to provide the second notification by image display.

4. The notification control device according to claim 1, wherein the cancellation process signal that is sent when the first notification controller obtains a sound signal as the first response information is a cancellation process signal that is sent when the first notification controller obtains an operation signal as the first response information, the operation signal indicating an operation performed on the device in response to the first notification.

5. The notification control device according to claim 1, wherein the cancellation process signal that is sent when the second notification controller obtains an operation signal as the second response information is a cancellation process signal that is sent when the second notification controller obtains the operation signal as the second response information, the operation signal indicating an operation performed on the device in response to the second notification.

6. A notification control system comprising:
the notification control device according to claim 1;
the first device that provides the first notification; and
the second device that provides the second notification.

7. A notification control method performed by a notification control device, the notification control method comprising:
obtaining notification information relating to an operation performed by a device;
sending a first notification control signal for causing a first device to provide a first notification indicating details of the notification information; obtaining first response information to the first device that has provided the first notification; and determining whether the first response information is in response to the notification information;
sending a second notification control signal for causing a second device to provide a second notification indicating the details of the notification information, when the first response information is determined not to be in response to the notification information, the second notification being implemented in a form different from a form of the first notification; obtaining second response information to the second device that has provided the second notification; and determining whether the second response information is in response to the notification information; and sending, to the first device and the second device, a cancellation process signal for cancelling the notifications indicating the details of the notification information, when the first response information is determined to be in response to the notification information or the second response information is determined to be in response to the notification information.

* * * * *